United States Patent Office 3,408,383
Patented Oct. 29, 1968

3,408,383
PREPARATION OF PENTAERYTHRITOL TRINITRATE
Henry A. Rolewicz, Charles D. Grimes, Jr., and Kenyon Stevenson, Jr., Huntsville, Ala., assignors to Rohm & Haas Company, Philadelphia, Pa., a corporation of Delaware
No Drawing. Filed Mar. 8, 1957, Ser. No. 644,957
3 Claims. (Cl. 260—467)

This invention deals with the nitration of pentaerythritol to form primarily the trinitrate and to give the trinitrate in a state of sufficient purity to impart the desired degree of stability, uniformity, and utility as to permit its use in the formation of stable useful derivatives, particularly of derivatives having a polymerizable ethylenic group, especially derivatives having a polymerizable vinylidene group.

Pentaerythritol trinitrate has not heretofore been preparable by direct methods in a state of good purity or with a reasonable degree of efficiency. A three step process has been proposed in which an attempt is made to block one hydroxyl group by esterification and nitrate the others and then hydrolyze the ester group. This method has not proved particularly efficient and there has remained a real need for a method leading to pentaerythritol trinitrate of good purity in good yield.

The method of this invention comprises a simple direct and efficient method for producing pentaerythritol trinitrate in a state which permits its practical use in combustible mixtures and in the preparation of derivatives having a polymerizable unsaturated ethylenic linkage through which polymers may be formed having manageable properties and being suitable for use in explosive and combustible mixtures. Such derivatives include acrylates, methacrylates, fumarates, maleates, and the like. It may also be used in the preparation of esters which find use in the pharmaceutical field.

According to the process of this invention pentaerythritol is treated with nitric acid in the presence of sulfuric acid and of methylene chloride at a temperature between about −5° and about +5° C., the pentaerythritol trinitrate as it forms is taken up in the methylene chloride, impurities are removed, and pentaerythritol trinitrate is separated in good purity.

The nitric acid used may be one of the commercial grades having a nitric acid content from about 70% upward, including fuming nitric acid as well as absolute nitric acid. The commonest grades of about 70% to 90% are those generally used. Before the nitric acid is brought in contact with pentaerythritol, however, it should be freed of oxides which would lead to nitrites. This is readily done by sparging the acid with air or an inert gas, such as nitrogen, and treating the acid with a scavenging agent, such as urea. Nitric acid which has thus been prepared or which is of an equivalent purity is here termed oxide-free nitric acid.

The oxide-free nitric acid is used in a proportion at least equivalent to forming the trinitrate up to an eightfold excess, an excess of 100% to 200% being preferred.

For practical results the nitric acid is used in conjunction with sulfuric acid. While these two acids may be added separately to the reaction mixture and/or at different times, it is convenient to consider proportions and strengths in terms of the resulting mixed acid. Whatever the concentration of the individual acids used may be, their concentrations in the mixed acid formed should be from about 30% to 45% of nitric acid and 35% to 55% of sulfuric acid with water in the mixed acid being present at least to the extent of 5% and not over 25%, the proportions of acid being adjusted to make 100%.

In the preferred method oxide-free nitric acid is mixed with pentaerythritol. The order of addition is not critical, although it is usually most convenient to add pentaerythritol to nitric acid. Mixing is done at temperatures of −10° to +10° C. Water may, if needed, be mixed with the nitric acid in an amount such that the above-noted concentrations of the mixed acid will result. The pentaerythritol dissolves in the aqueous nitric acid.

Before or after the mixing of nitric acid and pentaerythritol, methylene chloride is added to the reaction mixture. In general about one volume or more of methylene chloride is added per volume of nitric acid or nitric acid and water and there may be used as many as eight volumes. The methylene chloride may be added at one time, in which case the ratio of methylene chloride should be in the upper range of proportions, conveniently two to six volumes per volume of the nitric acid. Alternatively, the methylene chloride may be added in several separate portions, each portion being separated from the acid mixture as will be more fully described below. When several additions are made, the total methylene chloride used may desirably be from two to three volumes per volume of the nitric acid solution, about 0.8 volume to two volumes being used in each step.

In the preferred method sulfuric acid is added of a strength which brings the resulting mixed acid to concentrations of nitric acid, sulfuric acid, and water within the concentrations set forth above. The sulfuric acid may be of 60% to 100% concentration. Any water added prior to the addition of sulfuric acid may be an amount which in conjunction with the strength of sulfuric acid available for use will give a mixed acid of an above-defined composition.

During the addition of the sulfuric acid the temperature of the reaction mixture is maintained between −5° and +5° C. This may be accomplished by controlling the rate of addition and by cooling the reaction mixture. If desired, the sulfuric acid may be cooled before it is added.

During the addition of sulfuric acid the reaction mixture is thoroughly agitated and agitated thereafter for 20 to 100 minutes to permit the reaction to proceed to a favorable extent, the temperature still being maintained at not over about 5° C.

The methylene chloride layer is now separated. If the ratio of the volume of methylene chloride used to volume of acid was low and/or if the reaction time is short, it is desirable to take off the methylene chloride first used and to add a second portion. The reaction mixture is again thoroughly agitated below about 5° C. for 10 to 100 minutes. This portion of methylene chloride is taken off and desirably combined with the first portion. The desired pentaerythritol trinitrate is almost entirely in the solvent, while only small amounts of pentaerythritol dinitrate and tetranitrate are held by the methylene chloride.

The spent acid after removal of the methylene chloride layer, which acid contains a suspension of solid pentaerythritol tetranitrate, is diluted with excess water. This causes a precipitation of pentaerythritol tetranitrate which heretofore was dissolved in the acid. There may result also a separation of a small amount of a methylene chloride solution, which may be taken off and used. Pentaerythritol tetranitrate is filtered off and can be recovered as a useful product.

The combined extracts are now washed with water. If desired, the washed extracts may be treated with a dilute aqueous sodium or potassium bicarbonate solution to neutralize any residual acid, a step, however, which is not essential. In any case it is desirable to wash a pH of 6 to 8.

The volume of aqueous alkali metal bicarbonate solution used should be about that sufficient to give a neutral to mildly alkaline solvent solution. If water is used after the bicarbonate wash or if water is used as the sole washing medium, it is desirable to keep the volume at the minimum which will reduce the water soluble contaminants in the organic layer and carry it to a pH of 6 to 8. It has been found desirable not to use more than about 17 parts by weight of solution and/or water per part of the pentaerythritol trinitrate formed. This proportion may be kept at a minimum by intimate and thorough mixing. During this operation temperatures shoud be kept below about 25° C. The wash water removes some pentaerythritol dinitrate and also a small amount of the trinitrate.

At this stage it is desirable to concentrate the methylene chloride solution of pentaerythritol trinitrate. Methylene chloride is distilled off at about 40° C. until the pot temperature begins to increase. The concentrated solution is then cooled below 30° C. and treated per volume of concentrate with one quarter to one half volume or more of a solvent for pentaerythritol trinitrate which is a non-solvent for pentaerythritol tetranitrate, diethyl ether being a prime example. The pentaerythritol trinitrate remains dissolved while the bulk of the pentaerythritol tetranitrate is present as a solid. The mixture is filtered, the tetranitrate recovered, and the filtrate subjected to distillation. Ether and methylene chloride are taken off. The residue may be heated up to about 60° C. at 10–20 millimeters (Hg) if it is desired to remove traces of solvent. The last portions of solvent need not, however, be removed as it is sometimes desirable to add a less volatile solvent to the pentaerythritol trinitrate and keep this product in the form of a solution. Thus, 5% to 25% of acetonitrile may be added as a suitable solvent to give non-sensitive liquid mixtures. Such solutions are desirable in using the pentaerythritol trinitrate as a chemical intermediate, while the stripped product can be used in combustible mixtures.

While methylene chloride has been shown as the solvent of choice, there have been successfully used other water-immiscible inert organic solvents, such as chloroform, chlorobenzene, and benzene, although yields and product purity were not quite so favorable as those shown above.

The process of this invention makes practical the direct nitration of pentaerythritol chiefly to the desired stage in which three of the four hydroxyl groups of pentaerythritol are substituted. The proportions of other nitration products and of unnitrated material are kept to a minimum. The tetranitrate which is obtained in a minor proportion can be recovered and finds application in conventional uses.

This invention is supported by the following examples which are presented for purposes of illustration and not by way of limitation.

Example 1

A stainless steel, jacketed reaction vessel equipped with a stirrer is charged with 4 kg. of water and with 10.95 kg. of commercial 95% nitric acid. With this mixture at 27°–32° C. air is bubbled through it for 15 minutes. Addition is made of 80 grams of urea and air is passed through the mixture for another 5 minutes. A total of 22.7 kg. of methylene chloride is run in. The mixture is cooled to 0° C. and 3.4 kg. of nitration grade pentaerythritol is charged. The mixture is stirred at 0°–2° C. for 10 minutes. Over a 30 minute period there is added 11.05 kg. of 94% sulfuric acid while the temperature of the reaction mixture is held between 0° and 2° C. by cooling. The whole mixture is stirred for an hour at this temperature range. Agitation is then stopped and layers are allowed to form. The top organic layer is siphoned from the reactor and retained.

The lower acid layer is treated with 40 grams of urea and stirring is resumed. To it is added 18.2 kg. of methylene chloride and the mixture is kept at 2°–4° C. for an hour. Agitation is stopped and layers are allowed to form. The top layer is siphoned off and added to the previously withdrawn top layer. The lower layer is diluted with 26.5 kg. of water. The pentaerythritol tetranitrate which was heretofore still dissolved separates as a solid and a small amout of methylene chloride separates. The latter is taken off and added to the top layers. The solid is filtered off, thoroughly washed with water, with a saturated sodium bicarbonate solution, and again with water, and dried. The spent acid is discarded.

The methylene chloride solution from the several layers is washed with 50 kg. of water in a column, the water being passed in at the bottom of the column and withdrawn at the top. The methylene chloride solution is washed with an aqueous 10% sodium bicarbonate solution to neutrality and is charged to a still containing 200 grams of solid sodium bicarbonate. Methylene chloride is evaporated at atmospheric pressure until the temperature in the pot reaches about 43° C. The concentration solution, amounting to about 7 kg., is drained from the still and cooled to 10° C., and treated with 2.15 kg. of diethyl ether. This mixture is left standing for 3 hours and filtered to remove the solid pentaerythritol tetranitrate which has separated. The pentaerythritol tetranitrate is washed as above and combined with the previously isloated portion. The filtrate is heated in a vessel on a water-bath to 35° C. under 10 mm. pressure for about 10 hours. There remains about 4 kg. of pentaerythritol trinitrate of a purity of over 95%. The yield is 59%.

Example 2

There are charged 98.4 lbs. of water and 271 lbs. of commercial 95% nitric acid to a nitrating reactor with the temperature at 25° C. The mixture is sparged with air for 15 minutes and treated with 1.7 lbs. of urea. The acid becomes water white. It is cooled to 0° C. There is added 83.6 lbs. of pentaerythritol of nitration grade. The mixture is stirred and sparged with air for another 10 minutes. There is added 558 lbs. of methylene chloride and the mixture is cooled to 0° C. There is now slowly added 96% sulfuric acid at such a rate that with the available cooling the temperature does not exceed 5° C., a total of 271 lbs. being used. With the temperature of the reaction mixture held between 0° and 5° C., the mixture is stirred for another hour. Stirring is stopped and layers are permitted to form, the temperature still being held at 0° to 5° C. The top layer is carefully drawn off and set aside. To the acid layer is added 455 lbs. of methylene chloride and the reaction mixture is stirred for about an hour at 0°–5° C. and then settled into layers. The organic layer is added to the first top layer. The acid layer is diluted with four volumes of water to precipitate the small quantity of pentaerythritol tetranitrate still dissolved. The pentaerythritol tetranitrate is filtered and recovered. The combined top layers are washed with an equal volume of aqueous 10% sodium bicarbonate solution to a pH above 7. The methylene chloride solution is then distilled at 40° C. until about 75% of this solvent is removed. Addition is made of 52 lbs. of diethyl ether with precipitation of pentaerythritol tetranitrate, which is filtered off. The filtrate is evaporated with warming to 50° C. and reducing the pressure to 10 mm., the product being kept under this low pressure over-night. The yield of pentaerythritol trinitrate is 60% and the assay by nitrate analysis and hydroxyl number is 100%.

Example 3

Sixty-eight milliliters of white fuming nitric acid of about 90% acid by weight (1.40 mole) is sparged at room temperature with dry air for fifteen minutes in a two-liter three-necked flask equipped with a fixed gas inlet tube. One gram of urea in 2 ml. of water is dissolved in the acid and sparging is continued for fifteen minutes. One liter of methylene chloride is added to the water-white acid and the entire mixture is chilled to 0° C. Twenty-four grams of pentaerythritol (0.176 mole) is added to the mixture and after it is dissolved, 57 ml. of concentrated (96%) sulfuric acid (1.13 mole) is added. A mildly exothermic reaction occurs during the addition of sulfuric acid, but the temperature of the reaction mixture is readily controlled by means of a small cooling bath. The two phase reaction mixture is vigorously stirred with air sparging at 5° C. for one and one-half hours. The mixture is transferred to a separatory funnel and the lower spent acid layer, after being added to an excess of ice water, yields 5.5 g. of pentaerythritol tetranitrate. The methylene chloride layer is washed once with a 150 ml.-portion of ice water, once with 100 ml. of 10% aqueous sodium bicarbonate, and once more with 100 ml. of ice water. The methylene chloride solution is dried over anhydrous magnesium sulfate and then concentrated at reduced pressure to a volume of 75–80 ml. More pentaerythritol tetranitrate precipitates at this point (4.5 g., bringing the total to 0.032 mole) and is separated on a filter. When the remainder of the solvent is evaporated, 36.8 g. of pentaerythritol trinitrate is obtained (0.135 moles, 76.7%). Infrared assay is 96%.

When the above procedure is repeated but the reaction is conducted at 0° C., a 76.3% yield of pentaerythritol trinitrate is obtained in a purity of over 96%.

We claim:

1. A process for preparing pentaerythritol trinitrate which comprises reacting between about −5° and about 5° C. pentaerythritol with oxide-free nitric acid in a 100% to 200% excess in the presence of sulfuric acid which provides a mixed acid containing 30% to 45% of nitric acid, 35% to 55% of sulfuric acid, and 5% to 25% of water, and in the presence of methylene chloride, whereby nitrated pentaerythritol results and forms a solution in the methylene chloride, washing the methylene chloride solution with water, concentrating the washed solution, taking up the resulting concentrate in diethyl ether, filtering the resulting solution, and recovering pentaerythritol trinitrate from the filtrate.

2. In the process for preparing pentaerythritol trinitrate which comprises dissolving pentaerythritol in oxide-free nitric acid between −10° C. and 10° C., adding sulfuric acid to the resulting mixture with adjustment with water to give a mixed acid containing 30% to 45% nitric acid, 35% to 55% sulfuric acid, and 5% to 25% water while the temperature of the resulting reaction mixture is kept between about −5° C. and about 5° C., agitating the mixture for twenty to one hundred minutes, the improvement which comprises effecting the nitration reaction in the presence of 1 to 8 volumes of methylene chloride per volume of nitric acid, allowing an acid layer and a layer of methylene chloride solution to form after the twenty to one hundred minute reaction period, separating the methylene chloride solution, washing it until about neutral, concentrating the washed methylene chloride solution, treating the concentrated methylene chloride solution with diethyl ether whereby solid pentaerythritol tetranitrate forms, separating said tetranitrate, and recovering pentaerythritol trinitrate.

3. In the process for preparing pentaerythritol trinitrate which comprises dissolving pentaerythritol in oxide-free acid between −10° C. and 10° C., adding sulfuric acid to the resulting mixture to give a mixed acid containing 30% to 45% nitric acid, 35% to 55% sulfuric acid, and 5% to 25% water while the temperature of the resulting reaction mixture is maintained between −5° C. and about 5° C., agitating the mixture for twenty to one hundred minutes, the improvement which comprises conducting the reaction in the presence of 0.8 to 2 volumes of methylene chloride per volume of nitric acid, allowing an acid layer and a layer of methylene chloride solution to form after said agitation period, removing said methylene chloride solution, adding to the acid layer 0.8 to 2 volumes of methylene chloride per volume of nitric acid, agitating the resulting mixture for ten to one hundred minutes, allowing layers of acid and methylene chloride to form, separating said methylene chloride solution, combining said methylene chloride solution with methylene chloride solution first removed, washing the combined methylene chloride solutions to a pH of 6 to 8, concentrating the washed methylene chloride solutions, treating the resulting concentrate with diethyl ether which causes solid pentaerythritol tetranitrate to separate, removing said pentaerythritol tetranitrate from the mixture, and recovering pentaerythritol trinitrate.

References Cited

UNITED STATES PATENTS

| | | | |
|---|---|---|---|
| 1,660,651 | 2/1928 | Marshall et al. | 260—467 |
| 1,691,954 | 11/1928 | Bergeim | 260—467 |
| 1,933,754 | 11/1933 | Paterson | 260—467 X |

OTHER REFERENCES

Camp et al., J.A.C.S. 77, 751, Feb. 5, 1955.
Boshan et al., "Chem. Rev.," 55, 487–8, 1955.

LELAND A. SEBASTIAN, *Primary Examiner.*

LEON D. ROSDOL, W. I. ANDRESS,
*Assistant Examiners.*